Aug. 4, 1936.   J. C. DRADER   2,049,490
GRINDING FIXTURE
Filed May 7, 1930   4 Sheets-Sheet 1
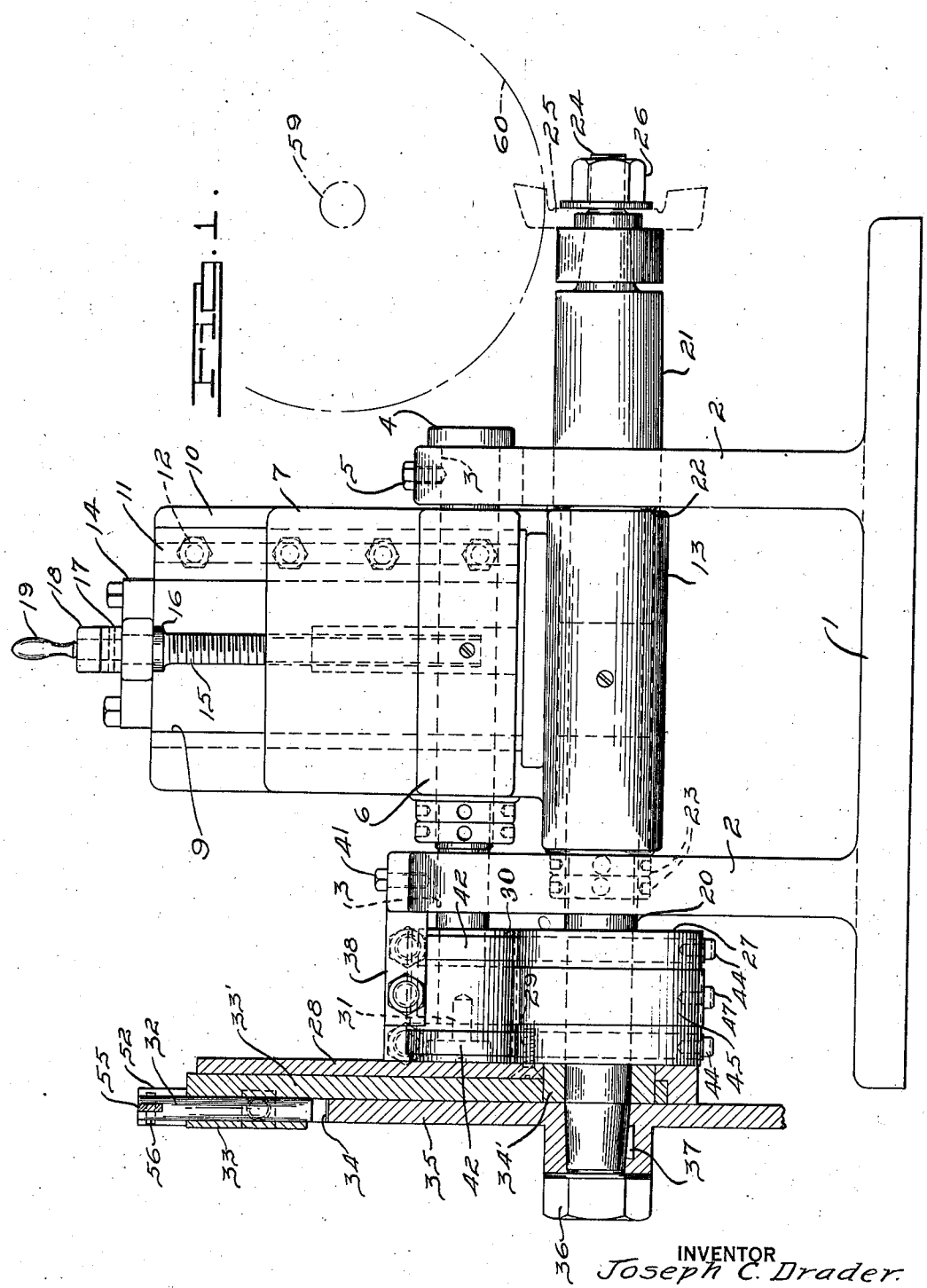
INVENTOR
Joseph C. Drader.
BY
Harness, Dickey, Pierce & Hann
ATTORNEYS.

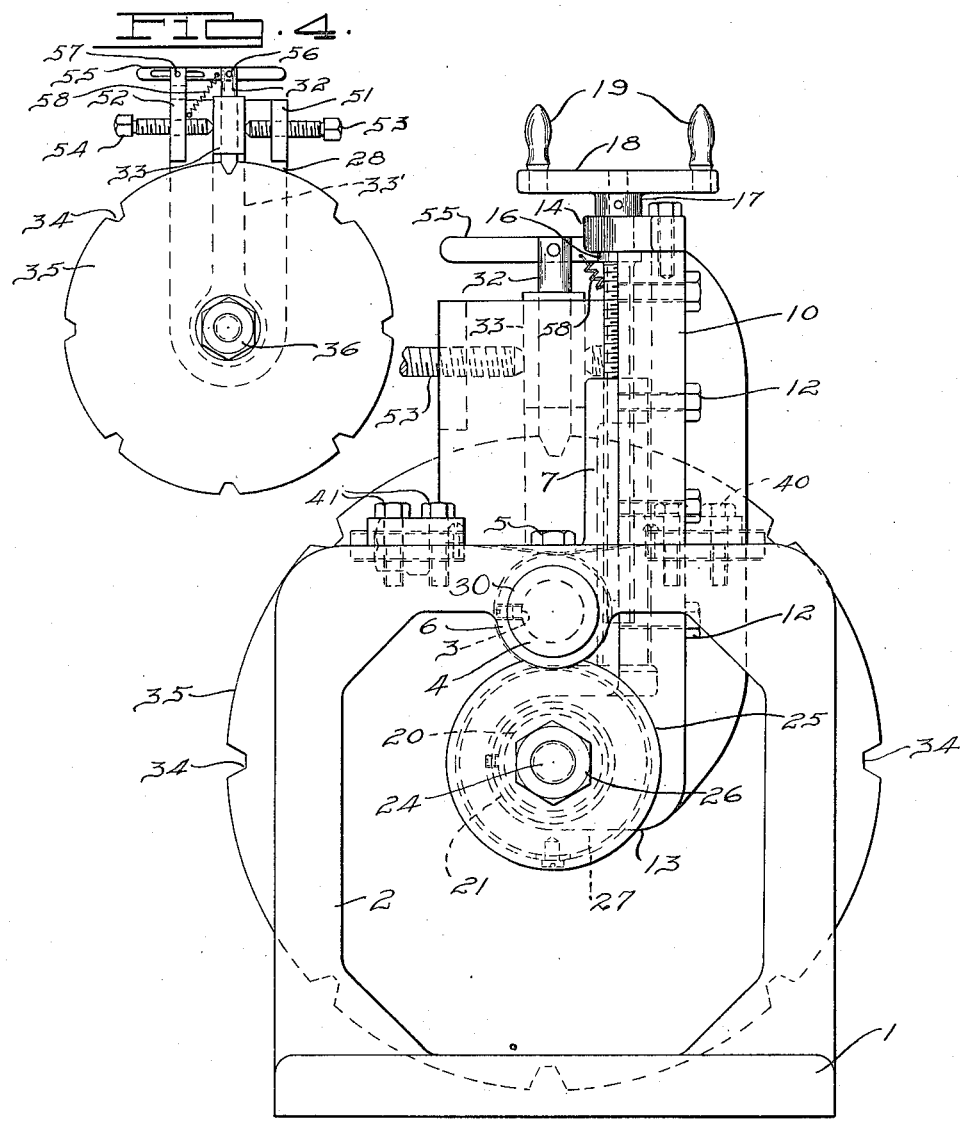

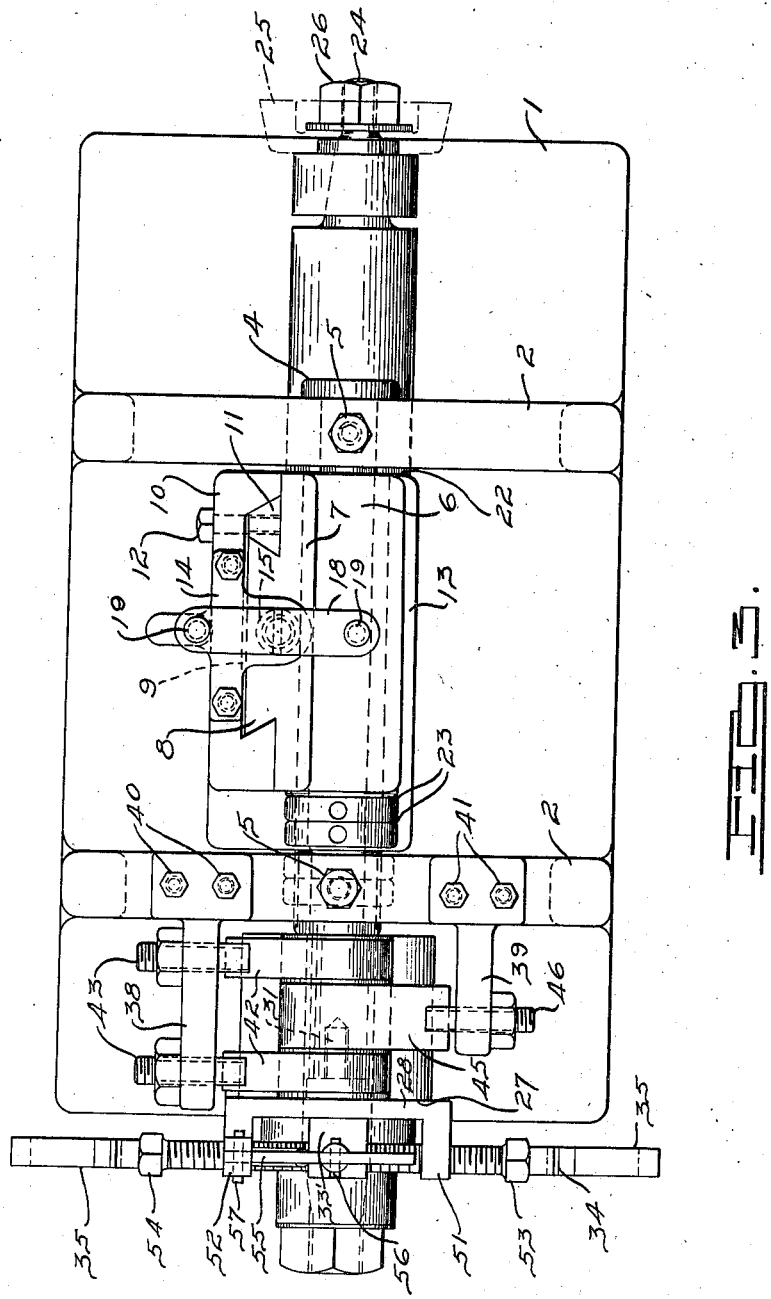

Aug. 4, 1936.　　　J. C. DRADER　　　2,049,490

GRINDING FIXTURE

Filed May 7, 1930　　　4 Sheets-Sheet 4

INVENTOR
Joseph C. Drader.
BY
ATTORNEYS.

Patented Aug. 4, 1936

2,049,490

UNITED STATES PATENT OFFICE 2,049,490

GRINDING FIXTURE

Joseph C. Drader, Detroit, Mich., assignor, by mesne assignments, to Michigan Tool Company, a corporation of Delaware Application May 7, 1930, Serial No. 450,554

4 Claims. (Cl. 51—124)

This invention relates to an improved method and apparatus for cutting circular cutters, particularly cutters of the kind which are adapted to form splines on a shaft.

The main objects of the invention are to provide apparatus for accurately generating cutting edges of proper contour on the teeth of a circular cutter; to provide means of this kind for cutting the teeth of a circular cutter to a contour which is adapted to form splines having radially offset side spaces on a shaft by the molding-generating principle; and to provide apparatus of this kind which comprises a fixture of simple and inexpensive construction that may be conveniently mounted on the bed of a conventional metal working machine.

Further objects of this invention are to provide improved means in a fixture of this kind for effecting in the coaction between a cutting element and a cutter, the rolling action which exists between the teeth of a pair of inter-engaged gears; to provide adjustable means by which a fixture of this type may be conveniently conditioned for machining or grinding cutters having generating circles of various diameters; and to provide means for adjustably positioning a cutter blank with respect to a cutting element before the gear teeth rolling action thereof is concerned.

An illustrative embodiment of my invention is shown in the accompanying drawings, in which:

Fig. 1 is a side elevation of a fixture embodying my invention.

Fig. 2 is a front end elevation of a grinding fixture.

Fig. 3 is a plan view thereof.

Fig. 4 is an elevation showing regulating apparatus with which the fixture is provided, as viewed from the rear end of the fixture.

Figure 5:
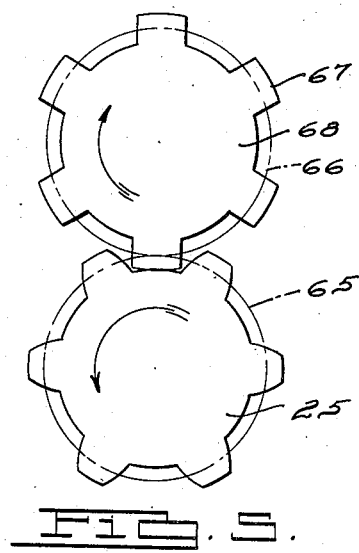
Fig. 5 is a diagrammatic view illustrating a circular cutter in working engagement with a shaft upon which splines are being formed.

In order to form splines having radially offset side faces on a shaft in the manner in which teeth are formed by a circular cutter, it is necessary to provide teeth on a circular cutter which would mesh with a gear having teeth identical in contour with the splines. This may be accomplished advantageously by a grinding or other cutting operation in which the generating circle of a circular cutter blank is rolled without sliding on a circular path of a diameter equal to that of the generating circle of the spline to be ultimately formed. If, during the above rolling action, the blank is held in contact with a grinding or other cutting element wheel which is rotated about an axis perpendicular to the axis of the blank and which has straight flat sides, each offset radially with respect to the axis of the blank an amount equal to one-half the thickness of the spline, the cutting element will form curvatures on both sides of the teeth of the cutter which will roll on the radially offset faces of the corresponding splines of a shaft. The opposite sides of the teeth of the blank, however, are preferably machines in separte operations.

When a cutter so formed, is reciprocated axially of a shaft and simultaneously rolled relative thereto in the above manner, the sides of the teeth of the cutter gouge out spaces in the periphery of the shaft for their accommodation, leaving splines having radially offset side faces between the adjacent spaces.

The problem encountered in the present invention is to provide a fixture for rolling a cutter blank relative to the peripheral portion of a grinding wheel or other cutting element in the manner in which a cutter would roll with respect to a tooth of a gear with which it meshed.

For the purpose of ease in description I will refer to the cutting element as a grinding wheel, which form is shown in the drawings, it being understood that other forms of cutting elements may be advantageously employed in its stead under favorable circumstances.

In the form shown the fixture includes a base 1 and spaced upright transverse support 2 which comprise frames having registering openings therethrough. The upper sides of the support 2 are provided with registering apertures 3 in which a pivot 4 is rigidly mounted and fixed by set screws 5. Journaled on the pivot 4 between the supports 2 is a bearing 6 having an integrally formed upright plate 7 thereon which extends above the support 2. A dovetail projection 8 formed on the rear side of the plate 7 extends into a similarly shaped recess 9 of a plate 10 which is slidably mounted on the swingably supported plate 7. The recess 9 of the plate 10 is wider than the projection 8 of the plate 7 and in the space between the adjacent right ends of the projection and recess is provided a gib 11 which is secured in adjusted position by a set screw 12. Formed on the lower end of the slidably mounted plate 10 is a bearing 13 which is located between the supports 1 and 2 and below the pivot 4.

The shiftably mounted plate 10 carries a bracket 14 in which is journaled a screw 15 which extends into a threaded aperture in the dovetail projection 8 of the plate 7. The screw 15 is secured against axial movement relative to the bracket 14 by an enlargement 16 on the screw located below the bracket 14 and a collar 17 which is seated on the upper side of the bracket 14. Rigidly secured to the upper end of the screw 15 is a crank 18 having handles or crank arms 19 thereon. The plate 10 and bearing 13 may be adjustably positioned relative to the plate 7 and pivot 4 with substantial precision by rotation of the screw 15.

Journaled in the bearing 13 of the slidably mounted plate 10 is a shaft 20 which has a section 21 at its right end, as viewed in Fig. 1, of enlarged diameter forming a shoulder 22 which abuts the right extremity of the bearing 13. Collars 23 are secured to the shaft 20 adjacent the left extremity of the bearing 13, as viewed in Fig. 1 so as to cooperate with the shoulder 22 in securing the shaft 20 against axial movement relative to the bearing. The shaft 20 extends through the central hollow portion of the rectangular frame-like support 2 and its respectively opposite ends extend beyond the latter support. A threaded part 24 is provided on the right end of the shaft 20 for receiving a cutter blank 25 which is rigidly mounted on the shaft by a nut 26.

Journaled on the left end of the shaft 20 is a drum 27 on which an upright arm 28 is rigidly mounted by a screw 29. The left end of the pivot 4 also extends in advance of the left support 2 and is provided with a drum 30 which is rigidly secured thereto by a screw 31 threaded in the end of the pivot. The drum 27 of the shaft 20 is releasably secured against rotation relative to the shaft 20 by a detent 32 slidably mounted in a sleeve 33 on an upright member 33' which is journaled on a bushing 34' on the shaft 20. The detent 32 is engageable in notches 34 of a disc 35 which is mounted on the extreme left end portion of the shaft 20 by a nut 36 and secured against relative rotation to the shaft 20 by a key 37.

Mounted on the left support 2 as viewed in Fig. 3, are a pair of brackets 38 and 39 located on respectively opposite sides of the pivot 4 and secured to the support by screws 40 and 41 respectively. A pair of flexible bands, preferably comprising metal straps 42 are each secured at one end to the bracket 38 by bolts 43 and disposed in a clockwise direction, as viewed from the end of Fig. 3, around the drum 30 of the pivot 4. These bands pass between the rollers 30 and 27 and are wound a fraction of a convolution in the opposite direction upon the drum 27 of the shaft 20. The lower extremities of the bands 42 are secured to the drum 27 by screws 44.

A third band 45 is secured at its upper end to the bracket 39 by a bolt 46 and wrapped around the drum 30 of the pivot 4 throughout a fraction of a convolution in a counter clockwise direction, as viewed from the end of Fig. 3. This band also passes between the rollers or drums 30 and 27 and is wound in an opposite direction on the drum 27, the lower end of the band being secured to the latter drum by a screw 47. The drums 27 and 30 are set apart a sufficient distance to accommodate the thickness of the bands 42 and 45. During swinging or oscillating of the bearing 13 and shaft 20 manually about the pivot 4, the bands 42 and 45 provide positive driving means for rotating the drum 27 and shaft in timed relation to the oscillation of the shaft, these bands causing the drums to roll upon each other without slipping.

Formed on the respectively opposite sides of the arm 28 are lugs 51 and 52 respectively in which adjustable bolts 53 and 54 are threaded. These bolts extend inwardly and abut the sides of the sleeve 33 so as to secure the upright member 33' against oscillation relative to the arms 28.

Pivotally and shiftably mounted on the lug 52 is a lever 55 which is pivoted at 56 to the detent 32 as shown in Fig. 4. The lever 55 is normally urged in a clockwise direction about its pivot 57 by a spring 58 which is secured at one end to the lever and at its other end to the lug 52. The detent 32 may be retracted from the notch 34 of the disc in which it is seated by lifting the right end of the lever 55 as viewed in Fig. 4. When it is desired to rotate the shaft 20 and the cutter 25 thereon relative to the drum 27, the detent 32 is raised in the above manner so as to permit free rotation of the disc 35. If it is desired to rotate the shaft and cutter a distance less than the distance between the successive notches 34 of the disc 35, the screws 53 and 54 may be manipulated so as to rotate the upright member 33' on which the detent 32 is mounted together with the disc 35 in either direction.

In operation, the fixture is mounted upon a shiftable table of a machine which has a spindle 59 on which is mounted a grinding wheel 60 with the axis of the shaft 20 substantially perpendicular to the axis of the spindle. The grinding wheel 60 has a straight flat side 61 which is substantially normal to its axis of rotation and a peripheral portion 62 approximately perpendicular to the flat side 61. The remainder of the periphery of the wheel is cut off as shown at 63 in Fig. 6.

The fixture, with either a plain cutter blank, or a blank which has been roughed out mounted on the shaft 20 thereof, is moved toward the grinding wheel 60 so as to gradually bring the blank into grinding engagement with the wheel. When the cutter blank has reached a position directly below the spindle 59, the shaft 20 is oscillated or partially revolved about the pivot 4 upon the arcuate path indicated at 64. During this movement of the shaft the drums 27 and 30 and bands 42 and 45 cooperate to rotate the shaft and the cutter blank 25 about its axes in a timed relation to the revolving movement of the shaft so as to cause the generating circle indicated at 65 in Fig. 6 to, in effect, roll upon the generating circle indicated at 66 which has a diameter substantially equal to the generating circle of the splines 67 ultimately to be formed on a shaft.

The combined rotating and revolving movements of the cutter 25 with respect to the grinding surfaces of the wheel 60 is substantially identical to the rolling action which exists between two properly meshed gears during rotation of the latter about fixed axes. As the grinding side of the wheel is straight and offset relative to the center 68 which corresponds to the center of the generating of the circle 66 of the spline, the wheel grinds away or gouges out, the material of the cutter blank 25 forming teeth 69 thereon which have side faces that are adapted to roll upon teeth of a meshed gear having radially offset side faces corresponding with the side faces of splines. During this operation the table (not shown) of the machine upon which the fixture is mounted, may be reciprocated to insure proper grinding of the entire length of the cutter teeth, but ordinarily the grinding wheel will be of sufficient diameter and the cutter teeth of sufficiently short length to eliminate the necessity of such reciprocating movement.

When a cutter formed in the above manner is simultaneously reciprocated and rolled with its generating circle rolling without slipping upon a generating circle which is concentric with the center of a shaft and equal in diameter to the circle 66, the teeth 69 of the cutter form splines on the shaft having radially offset side faces.

Figure 6:
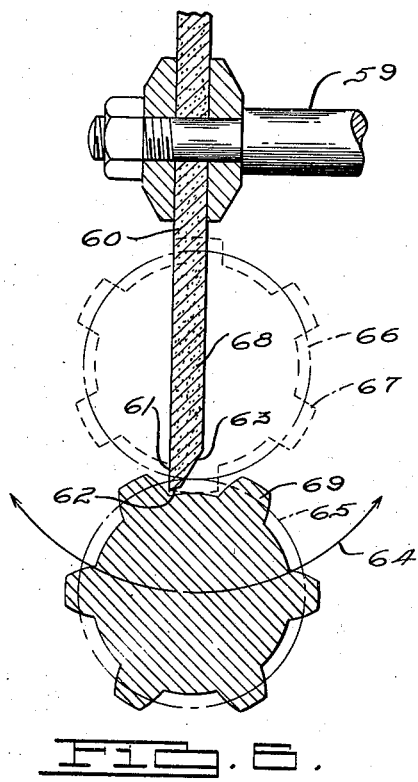
Fig. 6 is a diagrammatic view illustrating the operation by which the teeth of a circular cutter are ground to a generated contour suitable for forming splines on a shaft.

With the grinding wheel shown in Fig. 6, only one side of each tooth 69 may be formed, but by subjecting the cutter blank to a grinding operation identical to that described above, upon a wheel having a flat cutting surface on the side thereof opposite to the side 61 of the wheel 60, the other side faces of the teeth may be formed. This may be accomplished by removing the wheel 60 from the spindle 59 and replacing it with the cutting side 61 on the right side, as viewed in Fig. 6.

The cutter blank 25 may be rotated through predetermined distances so as to bring the corresponding side faces of successive teeth into registration with the wheel by retracting the detent 32 from the notch 34 in which it is seated and rotating the disc 35 which is keyed to the shaft 20 until the detent registers with the next successive notch. In this manner the corresponding side faces of all of the teeth of the cutter may be ground in succession.

By manipulation of the adjustable bolts 53 and 54, the cutter may be rotated relative to the grinding wheel 60 without swinging the shaft 20 about the pivot 4 so as to properly position the periphery of the wheel between the teeth of a roughed out blank before oscillation of the shaft about the pivot 4 is commenced.

The distance between the pivot 4 of the fixture and the axis of the shaft 20 may be varied by manipulating the screw 15 by means of the crank 18 thereon, so as to determine the location of the path 61 in which the shaft is oscillated relative to the grinding wheel and the fixture may be conditioned for forming splines on shafts of various diameters by providing drums 27 and 30 which correspond in diameter respectively with the diameters of the generating circle of the cutting tool and the generating circle of the splines respectively.

The necessary clearance of relief for the cutting edges of the cutter may obviously be obtained in a number of different ways such as, for instance, by positioning the axes of the shafts 4 and 20 at an angle to the path of movement of the supporting table (not shown) where such table is reciprocated during the grinding operation, or by suitably positioning the cutter relative to the surface of the grinding wheel where the latter is of sufficient size, with respect to the cutter teeth, to eliminate the need of reciprocating such table.

Although but one specific embodiment of this invention has been herein shown and described, it will be understood that numerous details of the construction shown may be altered or omitted without departing from the spirit of this invention as defined by the following claims.

I claim:—

1. In a fixture for guiding a dressing tool, a support having a pivot thereon, a bearing member swingably mounted on said pivot, a shaft journaled on said bearing member having means for rigidly securing a cutter blank thereon, a pair of drums one on said pivot and one on said shaft, and flexible members attached at their ends to said drums and wrapped thereon for positively rotating said cutter blank in timed relation to the arcuate translation thereof during swinging of said bearing member.

2. In combination with a rotatable spindle having a grinding wheel thereon, a fixture having a pivot substantially perpendicular to said spindle, a bearing member swingably mounted on said pivot, a shaft journaled in said bearing having means for rigidly supporting a cutter blank, the axis of said shaft being parallel to the axis of said pivot, a pair of drums one on said pivot and one on said shaft, and flexible members attached at their ends to said drums and wrapped thereon for positively rotating said cutter blank in timed relation to the arcuate translation thereof during swinging of said bearing member.

3. In a fixture for guiding a dressing tool, a support having a pivot thereon, a bracket journaled on said pivot, a bearing member adjustably mounted on said bracket, a shaft journaled on said bearing member, means coacting with said bracket and bearing member for varying the distance between said shaft and said pivot, means on said shaft for securing a cutter blank thereon, a pair of drums, one on said shaft and the other on said pivot, and a band secured to said drums and wound thereon for rolling the generating circle of said cutter blank on an arcuate path during swinging of said bracket, said arcuate path being variable by changing the distance between said shaft and pivot and the diameters of said drums correspondingly.

4. In combination with a grinding wheel, a fixture including a support having a pivot, a bearing member swingably mounted on said pivot, a shaft journaled in said bearing member having means for securing a cutter blank thereto, a pair of rollers, one journaled on said shaft and the other fixed on said pivot, a band secured at its respectively opposite ends to said rollers and wound thereon in respectively opposite directions, and variable coacting members on the drum of said shaft and on said shaft for forming a positive driving connection between said shaft and the drum thereon.

JOSEPH C. DRADER.